June 6, 1939.　　　　A. E. JURS　　　　2,161,171
GAS FLOW REGULATOR
Filed Feb. 17, 1936　　　2 Sheets-Sheet 1
FIG_1_
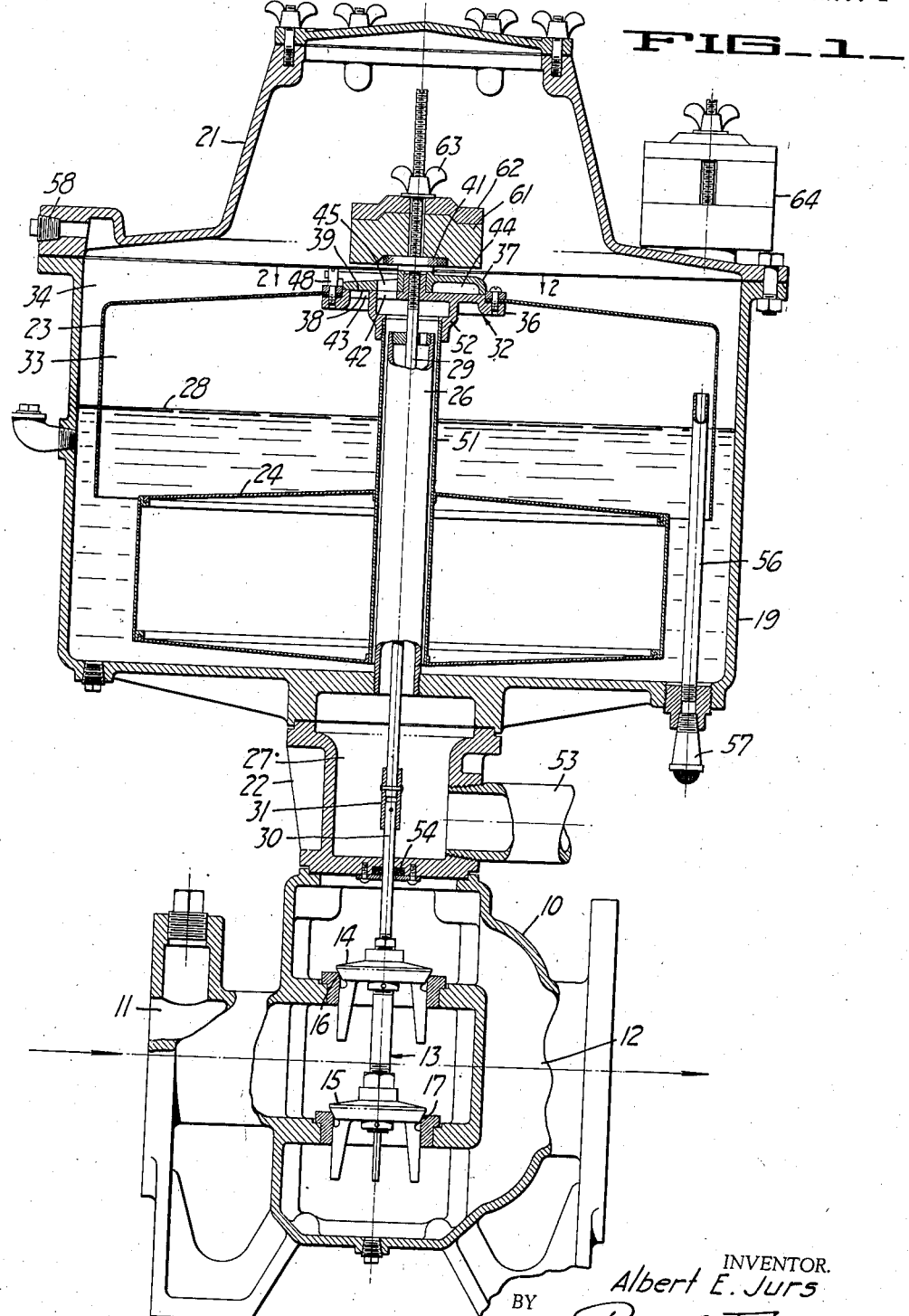
INVENTOR.
Albert E. Jurs
BY
Paul D. Flehr
ATTORNEY.

June 6, 1939.  A. E. JURS  2,161,171
GAS FLOW REGULATOR
Filed Feb. 17, 1936  2 Sheets-Sheet 2
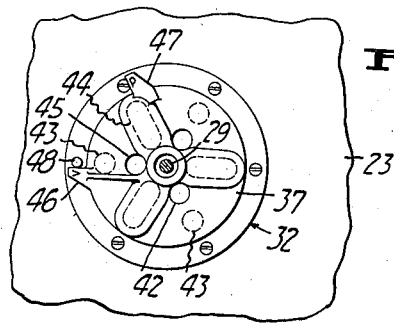
FIG_2_
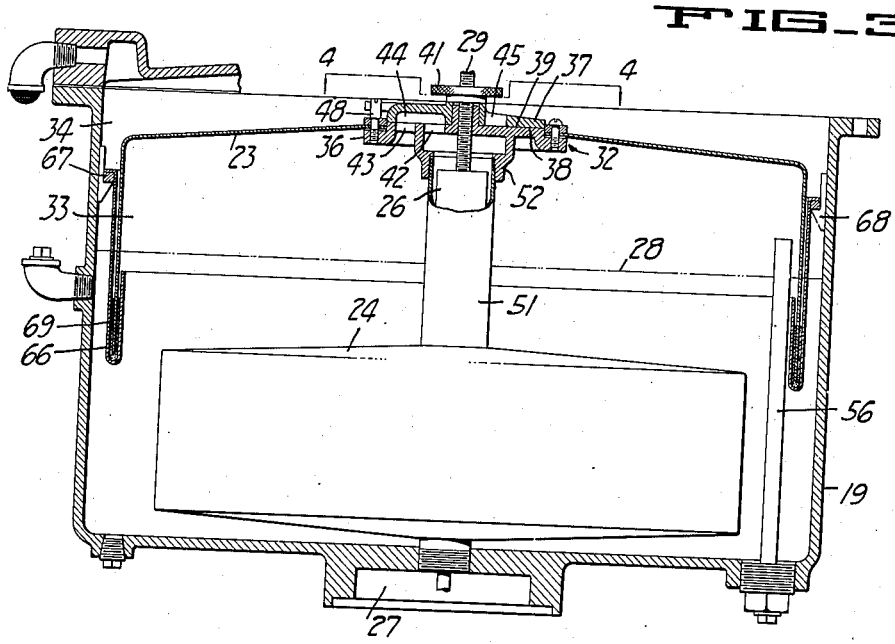
FIG_3_
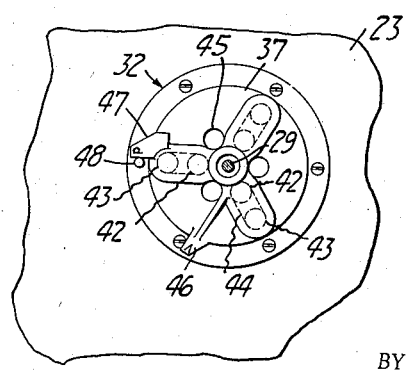
FIG_4_
INVENTOR.
Albert E. Jurs
BY Paul W. Fleher
ATTORNEY.

Patented June 6, 1939

2,161,171

UNITED STATES PATENT OFFICE 2,161,171

GAS FLOW REGULATOR

Albert E. Jurs, Piedmont, Calif.

Application February 17, 1936, Serial No. 64,362

8 Claims. (Cl. 137—153)

This invention relates generally to apparatus for regulating the flow of gases in response to varying gas pressures. More specifically it relates to apparatus for controlling flow of relatively large volumes of gas, with a high degree of sensitivity and accuracy with respect to the pressure variations employed for its operation. Such regulators have many useful applications, including systems for controlling the pumping of gases or vapors from closed storage tanks containing volatile petroleum liquids, as disclosed in Patent No. 1,803,460.

It is an object of the invention to provide a regulator of the above character which will dispense with the use of expensive mercury seals surrounding the main valve operating member, and which will be capable of long useful service without deterioration with respect to sensitivity and accuracy.

It is a further object of the invention to provide a gas regulator which can be readily converted for operation responsive to either sub-atmospheric pressures, or pressures above atmospheric. In this connection the apparatus incorporates a simple change-over valve which can be set in either one of two positions for the type of operation desired.

Further objects of the invention will appear from the following description in which the preferred embodiments of the invention have been set forth in detail in conjunction with the accompanying drawings.

Fig. 1 is a side elevational view, in cross-section, illustrating a regulator incorporating the present invention.

Fig. 2 is a detail cross-sectional view, taken along line 2—2 of Fig. 1.

Fig. 3 is a detail cross-sectional view, showing a modification suitable for regulation in accordance with pressures considerably higher than pressures for which the apparatus of Fig. 1 can be utilized.

Fig. 4 is a cross-sectional detail, taken along the line 4—4 of Fig. 3.

The apparatus as illustrated in the drawings consists of a valve chamber 10, having inlet and outlet openings 11 and 12. Within the valve chamber there is a balanced valve 13, the valve discs 14 and 15 of which cooperate with the valve seats 16 and 17. Above the valve casing 10 there is a container 19, which contains a quantity of liquid, such as a suitable oil, and which is closed by the cover 21. The valve casing is shown connected to the container 19 by means of an intermediate casing section 22.

Disposed within the closed chamber afforded by container 19, there is a bell 23, the lower peripheral edge portion of which is submersed in the liquid. This bell can be circular in contour, to conform to a circular contour of the container 19. Below the bell 23 and entirely immersed in the liquid, there is a hollow float 24. By means to be presently described, the float, together with the bell and the valve member 13, are connected together to move in unison.

Extending upwardly from the bottom of the container 19, there is a pipe 26, the lower end of which is in communication with the space 27 afforded by the intermediate casing section 22. The upper end of pipe 26 is open, and terminates above the normal liquid level 28, but below the upper part of the bell 23. Extended upwardly through the pipe 26, there is a valve operating rod 29, the lower end of which is attached to the stem 30 of the balanced valve 13, by coupling device 31. Interposed between the operating rod 29 and the bell 23 there is a valve means 32 which can be adjusted so that the upper end of pipe 26 is either placed in communication with the closed space 33 within the bell, or with the closed space 34 surrounding the bell.

The representative form of valve means 32 illustrated consists of two parts 36 and 37, both of which are annular in contour. The part 37 is rotatable about the axis of operating rod 29, relative to the part 36. The valve part 36 is shown accommodated in an aperture provided centrally within bell 23, and its marginal edge is clamped to the adjacent edge of the bell in such a manner as to establish sealing engagement. The upper face of the part 36 is machined to form a flat valve surface 38, which cooperates with a corresponding valve surface 39 formed on the lower face of part 37. Rod 29 has a threaded engagement with the lower part 36, and the upper part 37 can be clamped down to establish tight sealing engagement between the valve surfaces 38 and 39, by means of a nut 41. The arrangement of ports provided for this valve can be best understood by reference to Figs. 2 and 4, taken in conjunction with Fig. 1. Thus the lower valve part 36 is provided with a plurality of circumferentially spaced ports 42, which are in communication with the space immediately above the upper end of pipe 26. Additional spaced ports 43 are provided, which are in communication with the space 33 within the bell 23. The lower face of the upper valve 37 is interrupted by the radially extending grooves 44, and is also provided with the spaced ports 45. A pair of spaced lugs 46 and 47 project from the upper valve part 37, and are adapted to cooperate with a fixed stop which can be formed by the upper end of screw 48. When the upper valve part 37 is positioned as illustrated in Figs. 1 and 2, ports 42 register with ports 45, and thus communication is established through these ports between the upper end of pipe 26 and the closed chamber space 34. When the upper valve part is turned to the alternative position illustrated in Fig. 4, ports 42 and 43 are placed in communication through the groove 44, and therefore the upper end of pipe 26 is placed in communication with the space 33, to the exclusion of space 34.

The float 24 has a central opening to accommodate pipe 26. In order to connect this float to the bell 23, it is secured to a tube 51, which has ample clearance about pipe 26. The upper end of tube 51 is secured to the lower valve part 36, as by means of a threaded connection to the annular portion 52.

The source of varying gas pressure, by means of which it is desired to control operation of the regulator, can be conveniently connected to the space 27, by pipe 53. Preferably some form of packing is provided about stem 30, to minimize leakage from the valve casing into space 27. The packing utilized for this purpose should offer a minimum of friction to vertical movements of the valve stem, and need not afford a perfect seal. To serve this purpose a washer 54 has been shown surrounding the stem 30, and this washer may be of suitable material such as leather.

Assuming that sub-atmospheric pressures are being utilized to control operation, the space 33 within the bell is connected to the atmosphere. When regulation is being effected by the use of pressures above atmospheric, such pressures are applied to space 33, while space 34 is vented to the atmosphere. For the first mentioned condition, the space 33 in Fig. 1 is shown being vented to the atmosphere through the pipe 56 and the external strainer 57. When converting the apparatus for operation responsive to pressures above atmospheric, strainer 57 is removed and attached in place of the plug 58, while this plug takes the place of the strainer, to seal space 33.

A gravity bias is provided, tending to urge the balanced valve member 13 towards closed position, in order to secure operation at certain predetermined pressure values. To provide such a bias, weights 61 and 62 are shown carried upon the nut 41, and are held in place by the wing nut 63. Supplemental weights 64 can be conveniently carried upon the cover 21, and can be used to replace or supplement the weights 61 and 62, to secure a desired setting.

Operation of the apparatus described above can be reviewed as follows: Assuming that it is desired to effect an automatic closing of the balanced valve member 13 when the gas pressure to which pipe 53 is connected, drops below a predetermined sub-atmospheric value, valve 32 is set as illustrated in Fig. 1, so that suction is transmitted through pipe 26, to the chamber space 34, while space 33 is vented to the atmosphere through pipe 56 and strainer 57. Float 24 is of such dimensions that the force of its buoyancy is sufficient to balance the weight of the moving parts, with the exception of the weights 61 and 62. As long as the suction applied to pipe 53 is greater than the value selected for operation, the differential pressure between spaces 33 and 34, presses upwardly upon bell 23, to maintain the balance valve 13 open. When the suction applied to pipe 53 decreases to or slightly below the value selected for operation, the differential pressure between spaces 33 and 34 is insufficient to hold the valve 13 open, and the valve moves to closed position. For operation in accordance with variations in pressure above atmospheric, valve member 32 can be set as illustrated in Fig. 3, with the space 34 surrounding the bell vented to the atmosphere, and with space 33 placed in communication with the pipe 26.

As long as the pressure applied to pipe 53 is above the value selected for operation, the balance valve 13 is held in open position, due to the upward pressure applied to the bell 23. When the pressure applied to pipe 53 falls to or slightly below the pressure selected for operation, the pressure applied to space 33 is no longer sufficient to hold the bell 23 elevated, and thus the valve moves to closed position.

The float 24 makes for increased sensitivity, in balancing the weight of the moving parts. For a reasonable range of control pressures for which apparatus is designed, the sensitivity thus gained characterizes the apparatus for operation both in response to pressures below and above atmospheric. Placing the liquid container 19 together with the bell 23 and float 24, above the valve casing 10, protects these parts against liquid components of gas being handled, and makes it possible to utilize a simple type of packing around the valve stem 30, in place of a more elaborate and expensive mercury seal. A slight amount of leakage may occur about the valve stem 30 to or from the space 37, but such leakage will cause no difficulty, since it results in no appreciable error.

Fig. 3 illustrates a modification for use where it is desired to effect operation responsive to pressure considerably higher than pressures suitable for the apparatus of Fig. 1. In this case an annular trough 66 is provided, which accommodates the lower peripheral edge of the bell. This trough is suitably carried by the side walls of the container 19, as for example by having it attached to an annular ring 67, which in turn rests upon the lugs 68. A quantity of mercury 69 is carried within trough 66, to immerse the lower edge of the bell. The inner leg of the mercury seal so established is protected by the oil or like liquid within the container 19. The outer leg of the mercury seal can be protected by a quantity of the same oil, or by a small quantity of glycerine. With the arrangement described considerably higher pressures can be impressed within the space 33, without disrupting the seal between the bell and the liquid. In this modification the oil or like liquid in container 19 still establishes a seal between the trough 66 and the side walls of the container 19, thus making it unnecessary to establish a gas tight mechanical connection between these parts.

I claim:

1. In a regulator of the character described, a valve casing having fluid inlet and outlet openings, a flow control valve within the casing movable between open and closed positions, a closed liquid containing chamber above the valve casing, a bell within said chamber and having its depending peripheral edge portion immersed in the liquid, a float immersed in the liquid below said bell, a vertically extending rod connecting the valve to the bell, a pipe extending upwardly from the bottom of the chamber and surrounding said rod, the upper end of the pipe terminating above the level of liquid in the chamber, a tube surrounding said pipe and connected to the float at a point below the liquid level and to the bell at a point above the liquid level, whereby a liquid seal is formed between said tube and said pipe, and means for establishing communication between said pipe and one side of said bell.

2. In a regulator of the character described, a valve casing having fluid inlet and outlet openings, a flow control valve within the casing movable between open and closed positions, a closed liquid containing chamber above the valve casing, a bell within said chamber and having its depending peripheral edge portion immersed in the liquid, a float immersed in the liquid below said bell, means serving to connect the flow control valve, the bell, and the float to move in unison, and means including an adjustable valve movable together with the flow control valve, the bell and the float, and serving to establish communication between a source of variable gas pressure, and either side of said bell.

3. In a regulator of the character described, a valve casing having fluid inlet and outlet openings, a flow control valve within the casing movable in a vertical direction between open and closed positions, a closed liquid containing chamber, a bell within said chamber having its depending peripheral edge portion immersed in the liquid, means serving to connect together the flow control valve and the bell, whereby they are caused to move in unison, and means for applying a source of varying gas pressures on either side of said bell, said last means including an adjustable valve mounted upon said bell.

4. In a regulator of the character described, a valve casing having fluid inlet and outlet openings, a balanced flow control within the casing and movable in a vertical direction between open and closed positions, a closed liquid containing chamber disposed above the valve casing, a bell within said chamber and having its depending peripheral edge portion immersed in the liquid, a float immersed in the liquid below said bell, means serving to connect together the flow control member, the bell and the float to cause the same to move in unison in a vertical direction, and means for connecting either side of said bell to a source of gas of varying pressures, said last means including an adjustable valve mounted upon said bell.

5. In a regulator of the character described, a valve casing having fluid inlet and outlet openings, a balanced flow control valve within the casing and movable between open and closed positions, a closed liquid containing chamber disposed above the valve casing, a bell mounted within said chamber and having its depending peripheral edge portion immersed in the liquid, a float immersed in the liquid below said bell, a tube connected to the float and extending upwardly to a point above the liquid level, a pipe extending within said tube and having its lower end communicating through the bottom of the chamber and having its upper open end terminating at a point above the liquid level, a rod extending through said pipe and having its lower end connected to said flow control valve, and valve means carried by said bell serving to connect the bell to the rod and also serving to connect the bell and the rod to the upper end of said tube, said valve means being adjustable to establish communication between said pipe and the space within the bell, or between said pipe and the space surrounding the bell.

6. In a regulator of the character described, a valve casing having fluid inlet and outlet openings, a balanced flow control valve within the casing movable between open and closed positions, a closed liquid containing chamber disposed above the valve casing, a bell within said chamber and having its depending peripheral edge portions immersed in the liquid, an opening in the bell located centrally of its upper wall, a valve part occupying said opening and secured to the upper wall of the bell, a second valve part superposed over the first valve part and rotatable with respect to the same, a vertically extending pipe having its lower end communicating through the bottom of the chamber and having its upper end open and terminating above the level of liquid in the chamber, a tube surrounding said pipe and having its upper end secured to said first-mentioned valve part, said tube depending into the liquid within said chamber to establish a liquid seal, a rod extending through said pipe, the lower end of said rod being connected to said flow control valve and the upper end of the rod being connected to one of said valve parts, said valve parts being ported whereby for one position of the rotatable valve part communication is established between the space within the bell and said pipe, and whereby for the other position of said rotatable valve part communication is established between the space surrounding said bell and said pipe.

7. In a regulator of the character described, a valve casing having fluid inlet and outlet openings, a balanced flow control valve within the casing movable between open and closed positions, a closed liquid containing chamber above the valve casing, a casing section interposed between the valve casing and the chamber and adapted to be connected to a source of varying gas pressures, a bell within the chamber and having its depending peripheral edge portion immersed in the liquid, a float immersed in the liquid below said bell, a pipe disposed within said chamber and having its lower end communicating with the interior of said intermediate section through the bottom chamber wall, the upper end of said pipe being open and terminating above said liquid level, a rod extending upwardly through said pipe and having its lower end connected to said valve member, a tube surrounding said pipe and connected to said float, a valve part attached to the upper end of said tube and to the upper wall of said bell, said valve part being also attached to said rod whereby the bell, the float and the rod are caused to move in a vertical direction in unison, a rotatable valve part positioned upon said first-mentioned valve part, both said valve parts being ported whereby for one position of said rotatable valve part communication is established between said pipe and the interior of the bell, and for another position of said rotatable valve part communication is established between said pipe and the space surrounding the bell, to the exclusion of the interior of the bell.

8. In a regulator of the character described, a valve casing having fluid inlet and outlet openings, a flow control valve within the casing movable in a vertical direction between open and closed positions, a bell having a depending peripheral edge portion, means forming a liquid seal with the depending peripheral edge portion of the bell and serving to form closed chambers on both sides of the bell, means serving to connect together the flow control valve and the bell, whereby they are caused to move in unison, and means for applying a source of varying gas pressures on either side of the bell, said last means including an adjustable valve mounted upon said bell.

ALBERT E. JURS.